(12) United States Patent
Shibata et al.

(10) Patent No.: US 9,567,904 B2
(45) Date of Patent: Feb. 14, 2017

(54) METHOD FOR CONTROLLING GAS TURBINE POWER PLANT, GAS TURBINE POWER PLANT, METHOD FOR CONTROLLING CARBON-CONTAINING FUEL GASIFIER, AND CARBON-CONTAINING FUEL GASIFIER

(71) Applicant: MITSUBISHI HITACHI POWER SYSTEMS, LTD., Kanagawa (JP)

(72) Inventors: Yasunari Shibata, Tokyo (JP); Yuichiro Kitagawa, Tokyo (JP); Kengo Shibata, Tokyo (JP); Yuichiro Urakata, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 365 days.

(21) Appl. No.: 14/348,271

(22) PCT Filed: Oct. 17, 2012

(86) PCT No.: PCT/JP2012/076758
§ 371 (c)(1),
(2) Date: Mar. 28, 2014

(87) PCT Pub. No.: WO2013/058253
PCT Pub. Date: Apr. 25, 2013

(65) Prior Publication Data
US 2014/0230451 A1    Aug. 21, 2014

(30) Foreign Application Priority Data

Oct. 19, 2011    (JP) ................................. 2011-229854

(51) Int. Cl.
*F02C 3/28*    (2006.01)
*C10J 3/48*    (2006.01)
(Continued)

(52) U.S. Cl.
CPC .................. *F02C 3/28* (2013.01); *C10J 3/485* (2013.01); *C10J 3/723* (2013.01); *C10J 3/76* (2013.01);
(Continued)

(58) Field of Classification Search
CPC ............ C10J 3/485; C10J 3/506; C10J 3/721; C10J 3/723; C10J 3/726; C10J 3/76; C10J 3/86; C10J 2300/093; C10J 2300/1653; C10J 2300/1884; C10J 2300/1892; F02C 3/28; F02C 9/00; Y02E 20/16; Y02E 20/18
(Continued)

(56) References Cited

U.S. PATENT DOCUMENTS 4,472,936 A * 9/1984 Uchiyama ................. F02C 3/28
                                                      60/39.12
5,050,374 A * 9/1991 Hunter ....................... C10J 3/54
                                                      60/39.12
(Continued)

FOREIGN PATENT DOCUMENTS

CN    2816046    9/2006
JP    59-219390    12/1984
(Continued)

OTHER PUBLICATIONS

Decision to Grant a Patent issued Aug. 4, 2015 in corresponding Japanese patent application No. 2011-229854.
(Continued)

*Primary Examiner* — Bryon Gehman
(74) *Attorney, Agent, or Firm* — Wenderoth, Lind & Ponack, L.L.P.

(57) ABSTRACT

A method for controlling a gas turbine power plant, a gas turbine power plant, a method for controlling a carbon-containing fuel gasifier, and a carbon-containing fuel gasifier that can keep constant the amount of heat generated from a
(Continued)

synthetic gas produced by the carbon-containing fuel gasifier. The gas turbine power plant includes a coal gasifier including a coal gasifier unit that gasifies a fuel containing carbon to produce a synthetic gas and a water-cooled wall duct disposed on the coal gasifier unit and to which a coolant, i.e., water, is directed; a gas turbine combustor that combusts the synthetic gas to produce combustion gas; a gas turbine rotated by the combustion gas produced by the gas turbine combustor; and a generator that generates electrical power. The amount of fuel fed to the coal gasifier is controlled depending on the amount of heat absorbed by the coolant directed to the water-cooled wall duct.

20 Claims, 5 Drawing Sheets

(51) Int. Cl.
    *C10J 3/72*     (2006.01)
    *C10J 3/76*     (2006.01)
    *C10J 3/86*     (2006.01)
    *F02C 9/00*     (2006.01)

(52) U.S. Cl.
CPC .. *C10J 3/86* (2013.01); *F02C 9/00* (2013.01); *C10J 2300/093* (2013.01); *C10J 2300/1653* (2013.01); *C10J 2300/1884* (2013.01); *C10J 2300/1892* (2013.01); *Y02E 20/16* (2013.01); *Y02E 20/18* (2013.01)

(58) Field of Classification Search
USPC .......... 48/61; 60/39.12, 39.281, 39.463, 773, 60/781
See application file for complete search history.

(56) References Cited

U.S. PATENT DOCUMENTS

| | | | |
|---|---|---|---|
| 5,145,491 A | 9/1992 | Schmitt et al. | |
| 6,226,976 B1* | 5/2001 | Scott | F02C 9/28 60/39.281 |
| 6,609,378 B2* | 8/2003 | Scott | F02C 9/40 60/39.281 |
| 8,343,242 B2* | 1/2013 | Geest | C10J 3/20 48/61 |
| 8,381,506 B2* | 2/2013 | Bhatnagar | F02C 3/28 60/39.281 |
| 8,888,872 B2* | 11/2014 | Chen | C01B 3/36 48/61 |
| 9,003,764 B2* | 4/2015 | Thacker | F02C 1/06 60/775 |
| 9,017,435 B2* | 4/2015 | Leininger | C10J 3/485 48/61 |
| 9,290,708 B2* | 3/2016 | Leininger | C10J 3/723 |
| 9,447,337 B2* | 9/2016 | Steele | C10J 3/506 |

FOREIGN PATENT DOCUMENTS

| | | |
|---|---|---|
| JP | 2000-303079 | 10/2000 |
| JP | 2002-146366 | 5/2002 |
| JP | 2002-167583 | 6/2002 |
| JP | 2004-18703 | 1/2004 |
| JP | 2010-285564 | 12/2010 |

OTHER PUBLICATIONS

Notification of Grant of Invention Patent issued Jan. 20, 2016 in corresponding Chinese patent application No. 201280039266.6 (with English translation).
International Search Report issued Dec. 25, 2012 in International Application No. PCT/JP2012/076758.
Written Opinion of the International Searching Authority issued Dec. 25, 2012 in International Application No. PCT/JP2012/076758.
Office Action issued Jun. 2, 2015 in corresponding Chinese patent application No. 201280039266.6 (with English translation).

* cited by examiner

METHOD FOR CONTROLLING GAS TURBINE POWER PLANT, GAS TURBINE POWER PLANT, METHOD FOR CONTROLLING CARBON-CONTAINING FUEL GASIFIER, AND CARBON-CONTAINING FUEL GASIFIER

BACKGROUND OF THE INVENTION

1. Technical Field

The present invention relates particularly to methods for controlling a gas turbine power plant, gas turbine power plants, methods for controlling a carbon-containing fuel gasifier, and carbon-containing fuel gasifiers that can keep constant the amount of heat generated from a synthetic gas produced by the carbon-containing fuel gasifier.

2. Description of the Related Art

There are known gas turbine power plants including a gasifier that gasifies coal, a combustor that combusts coal gas (synthetic gas) produced when the gasifier gasifies coal, a gas turbine that is driven by combustion gas output from the combustor, and a generator that generates electrical power as the gas turbine is rotated.

Japanese Unexamined Patent Application, Publication No. 2004-18703 discloses a gas turbine power plant that keeps constant the amount of heat generated from coal gas produced by a gasifier by determining the amount of heat generated from the coal gas from the proportions of the gas components contained in the coal gas at the inlet of a combustor.

Japanese Unexamined Patent Application, Publication No. 2010-285564 discloses a gas turbine power plant that keeps constant the amount of heat generated from coal gas output from a gasifier by adjusting the amount of coal fed to the gasifier based on the difference between the actual value of the output power of a generator and the target setting value of the output power of the generator, with the amount of air fed to the gasifier kept substantially constant.

Japanese Unexamined Patent Application, Publication No. 2002-167583 and Japanese Unexamined Patent Application, Publication No. 2002-146366 disclose that the variation in the amount of heat generated from coal gas produced by a gasifier is reduced by measuring the temperature of the coal gas and correcting the feed ratio of coal to oxygen in the gasifier to improve the operability of the entire gas turbine power plant.

SUMMARY OF THE INVENTION

1. Technical Problem

The inventions disclosed in PTLs 1 to 4, however, involve a time delay in the control of the gasifier because they control the amount of coal charged into the gasifier based on the properties or temperature of coal gas downstream of the gasifier or based on the output power of the generator. As a result, the gas turbine might catch fire when the amount of heat generated from the coal gas output from the gasifier varies considerably.

In view of the foregoing background, an object of the present invention is to provide a method for controlling a gas turbine power plant, a gas turbine power plant, a method for controlling a carbon-containing fuel gasifier, and a carbon-containing fuel gasifier that can keep constant the amount of heat generated from a synthetic gas produced by the carbon-containing fuel gasifier.

2. Solution to the Problem

A method according to a first aspect of the present invention is a method for controlling a gas turbine power plant equipped with a carbon-containing fuel gasifier including a gasifier unit that gasifies a fuel containing carbon to produce a synthetic gas and a coolant wall that is disposed on the gasifier unit and to which a coolant is directed, a combustor that combusts the synthetic gas to produce combustion gas, a gas turbine that is rotated by the combustion gas produced by the combustor, and a power-generating unit that generates electrical power as the gas turbine is rotated, and the method includes controlling the amount of fuel fed to the carbon-containing fuel gasifier depending on the amount of heat absorbed by the coolant directed to the coolant wall.

Generally, in a carbon-containing fuel gasifier that gasifies a fuel containing carbon by pyrolysis, the change in the composition of the synthetic gas, i.e., the change in the amount of heat generated from the synthetic gas, is known to correlate with the change in the temperature of the synthetic gas in the gasifier unit. For a carbon-containing fuel gasifier including a gasifier unit surrounded by a coolant wall to which a coolant is directed, the amount of heat absorbed by the coolant is also known to change with the change in the temperature of the synthetic gas in the gasifier unit.

Accordingly, in the first aspect of the present invention, the amount of fuel fed to the carbon-containing fuel gasifier is controlled depending on the change in the amount of heat generated from the synthetic gas determined from the change in the amount of heat absorbed by the coolant fed to the coolant wall disposed in the gasifier based on the amount of heat absorbed by the coolant corresponding to the operating load command to the carbon-containing fuel gasifier. This allows a change in the amount of heat generated from the synthetic gas output from the carbon-containing fuel gasifier to be detected earlier than the methods in the related art in which the amount of fuel fed to the carbon-containing fuel gasifier is controlled depending on the composition of the synthetic gas output from the carbon-containing fuel gasifier or the output power of the power-generating unit. As a result, the time delay in the feed control of the fuel charged into the carbon-containing fuel gasifier can be reduced and the amount of heat generated from the synthetic gas output from the carbon-containing fuel gasifier and directed to the gas turbine combustor can be kept substantially constant. The gas turbine, therefore, can operate stably without catching fire, thus stabilizing the operation of a gas turbine power plant.

In the first aspect of the present invention, a change in the amount of heat absorbed is determined from factors that correlate with the amount of heat absorbed.

The change in the amount of heat absorbed by the coolant directed to the coolant wall is determined from factors that correlate with the amount of heat absorbed by the coolant. This allows a change in the amount of heat generated from the synthetic gas to be detected in the gasifier and thus allows the carbon-containing fuel gasifier to be controlled before the synthetic gas reaches the gas turbine combustor disposed downstream of the carbon-containing fuel gasifier. As a result, the time delay in the control of the amount of fuel fed to the carbon-containing fuel gasifier, depending on the condition of the synthetic gas output from the carbon-containing fuel gasifier or the output power of the power-generating unit, can be reduced. Thus, the amount of heat generated from the synthetic gas output from the carbon-containing fuel gasifier and directed to the gas turbine combustor can be kept substantially constant.

In the first aspect of the present invention, the factors that correlate with the amount of heat absorbed are a measured flow rate of the coolant at an inlet or an outlet of the coolant wall to which the coolant is directed, a temperature of the coolant at the inlet of the coolant wall, a pressure of the coolant at the inlet of the coolant wall, a temperature of the coolant at the outlet of the coolant wall, or a pressure of the coolant at the outlet of the coolant wall.

The change in the amount of heat absorbed by the coolant is determined using, as the factors that correlate with the amount of heat absorbed, a measured flow rate of the coolant at the inlet or outlet of the coolant wall to which the coolant is directed, a temperature of the coolant at the inlet of the coolant wall, a pressure of the coolant at the inlet of the coolant wall, a temperature of the coolant at the outlet of the coolant wall, and a pressure of the coolant at the outlet of the coolant wall. This allows a change in the amount of heat generated from the synthetic gas produced by the carbon-containing fuel gasifier to be detected to control the amount of fuel fed to the carbon-containing fuel gasifier. Thus, the amount of heat generated from the synthetic gas output from the carbon-containing fuel gasifier and directed to the gas turbine combustor can be kept substantially constant.

In the first aspect of the present invention, the carbon-containing fuel gasifier includes a steam drum connected to the gasifier unit, and the factors that correlate with the amount of heat absorbed are a measured flow rate of feedwater at an inlet of the steam drum or a measured flow rate of evaporation at an outlet of the steam drum, temperatures at the inlet and the outlet of the steam drum, and pressures at the inlet and the outlet of the steam drum.

The gasifier unit is connected to the steam drum, and the change in the amount of heat absorbed by the coolant is determined using, as the factors that correlate with the amount of heat absorbed, a measured flow rate of feedwater at the inlet of the steam drum or a measured flow rate of evaporation at the outlet of the steam drum, temperatures at the inlet and the outlet of the steam drum, and pressures at the inlet and the outlet of the steam drum.

In the first aspect of the present invention, the water level and pressure of the steam drum are controlled, and the flow rate of the feedwater at the inlet of the steam drum or the flow rate of the steam at the outlet of the steam drum can be handled as the amount of heat absorbed.

If the water level and pressure of the steam drum are controlled, the flow rate of the feedwater at the inlet of the steam drum or the flow rate of the steam at the outlet of the steam drum can be handled as the amount of heat absorbed because the saturation temperature is constant.

In the first aspect of the present invention, the coal gasifier unit has a gasifier heat exchanger unit, through which the coolant flows, disposed in a gas channel thereof, and the factors that correlate with the amount of heat absorbed are a flow rate of feedwater at an inlet of the gasifier heat exchanger unit or a flow rate of steam at an outlet of the gasifier heat exchanger unit, temperatures at the inlet and the outlet of the gasifier heat exchanger unit, and pressures at the inlet and the outlet of the gasifier heat exchanger unit.

The coal gasifier unit has the gasifier heat exchanger unit disposed in the gas channel thereof, and the change in the amount of heat absorbed by the coolant is determined using, as the factors that correlate with the amount of heat absorbed, a flow rate of feedwater at the inlet of the gasifier heat exchanger unit or the flow rate of steam at the outlet of the gasifier heat exchanger unit, temperatures at the inlet and the outlet of the gasifier heat exchanger unit, and pressures at the inlet and the outlet of the gasifier heat exchanger unit.

In the first aspect of the present invention, a change in the amount of heat absorbed is detected by performing a comparison and arithmetic on a measured value of the amount of heat absorbed and a setting value of the amount of heat absorbed to calculate an amount-of-generated-heat correction coefficient, and the amount of fuel fed is controlled based on the calculated amount-of-generated-heat correction coefficient.

A change in the amount of heat absorbed is detected by performing a comparison and arithmetic on a measured value of the amount of heat absorbed and a setting value of the amount of heat absorbed to calculate an amount-of-generated-heat correction coefficient. The amount of fuel fed is controlled based on the calculated amount-of-generated-heat correction coefficient.

In the first aspect of the present invention, the setting value of the amount of heat absorbed is a function of operating load. In the above invention, the operating load is a plant load command, a power-generating-unit output power command, or a gasifier load command.

The setting value of the amount of heat absorbed is determined from the relationship between the amount of heat absorbed and the operating load when the amount of heat generated from the synthetic gas produced by the coal gasifier 3 becomes stable.

A gas turbine power plant according to a second aspect of the present invention includes a carbon-containing fuel gasifier including a gasifier unit that gasifies a fuel containing carbon to produce a synthetic gas and a coolant wall that is disposed on the gasifier unit and to which a coolant is directed; a combustor that combusts the synthetic gas to produce combustion gas; a gas turbine that is rotated by the combustion gas produced by the combustor; a power-generating unit that generates electrical power as the gas turbine is rotated; and a control unit that controls the amount of fuel fed to the carbon-containing fuel gasifier depending on the amount of heat absorbed by the coolant directed to the coolant wall.

A method according to a third aspect of the present invention is a method for controlling a carbon-containing fuel gasifier equipped with a carbon-containing fuel gasifier including a gasifier unit that gasifies a fuel containing carbon to produce a synthetic gas and a coolant wall that is disposed on the gasifier unit and to which a coolant is directed, and the method includes controlling the amount of fuel fed to the carbon-containing fuel gasifier depending on the amount of heat absorbed by the coolant directed to the coolant wall.

A carbon-containing fuel gasifier according to a fourth aspect of the present invention includes a gasifier unit that gasifies a fuel containing carbon to produce a synthetic gas and a coolant wall that is disposed on the gasifier unit and to which a coolant is directed; and a control unit that controls the amount of fuel fed depending on the amount of heat absorbed by the coolant directed to the coolant wall.

3. Advantageous Effects of the Invention

The amount of fuel fed to the carbon-containing fuel gasifier is controlled depending on the change in the amount of heat generated from the synthetic gas determined from the change in the amount of heat absorbed by the coolant fed to the coolant wall disposed in the gasifier based on the amount of heat absorbed by the coolant corresponding to the operating load command to the carbon-containing fuel gasifier. This allows a change in the amount of heat generated from the synthetic gas output from the carbon-containing fuel gasifier to be detected earlier than the methods in the related art in which the amount of fuel fed to the carbon-containing fuel gasifier is controlled depending on the composition of the synthetic gas output from the carbon-containing fuel gasifier or the output power of the power-generating unit. As a result, the time delay in the feed control of the fuel charged into the carbon-containing fuel gasifier can be reduced to keep substantially constant the amount of heat generated from the synthetic gas output from the carbon-containing fuel gasifier and directed to the gas turbine combustor. The gas turbine, therefore, can operate stably without catching fire, thus stabilizing the operation of a gas turbine power plant.

DETAILED DESCRIPTION OF EMBODIMENTS OF THE INVENTION

A first embodiment of an integrated coal gasification combined cycle plant to which a coal gasifier unit according to the present invention is applied will be described below with reference to FIG. 1.

Figure 1:
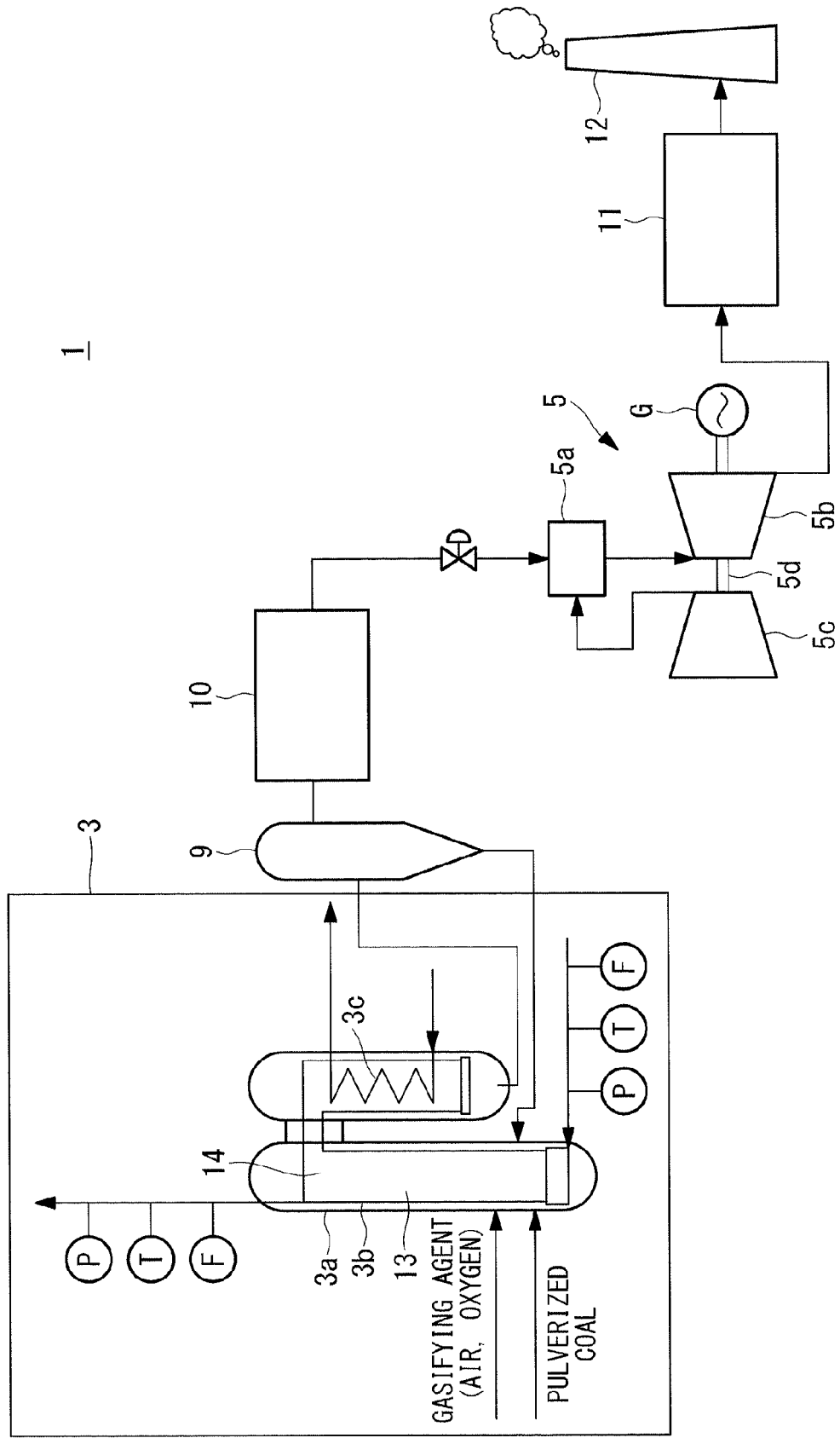
FIG. 1 is a schematic diagram of an integrated coal gasification combined cycle plant including a coal gasifier according to a first embodiment of the present invention.

FIG. 1 is a schematic diagram of the integrated coal gasification combined cycle plant including the coal gasifier unit according to this embodiment.

As shown in FIG. 1, an integrated coal gasification combined cycle (IGCC) plant 1 mainly includes a coal gasifier (carbon-containing fuel gasifier) 3 that gasifies coal (fuel containing carbon), a gas turbine system 5 to which a synthetic gas output from the coal gasifier 3 is directed, a generator G that generates electrical power as a gas turbine 5$b$ of the gas turbine system 5 and a steam turbine (not shown) connected to the same rotating shaft 5$d$ as the gas turbine 5$b$ are rotated, and a heat recovery steam generator (HRSG) 11 to which combustion gas that has passed through the gas turbine system 5 is directed.

A coal feed system (not shown) that feeds pulverized coal (fuel) to the coal gasifier 3 is disposed upstream of the coal gasifier 3. This coal feed system includes a pulverizer (not shown) that pulverizes raw coal into pulverized coal measuring several micrometers to several hundreds of micrometers. The pulverized coal pulverized by the pulverizer is stored in a plurality of hoppers (not shown).

The pulverized coal stored in each of the hoppers is transported to the coal gasifier 3 in predetermined amounts together with nitrogen fed from an air separator (not shown).

The coal gasifier 3 includes a coal gasifier unit (gasifier unit) 3$a$ configured such that gas flows from the bottom to the top thereof and a water-cooled wall duct (coolant wall) 3$b$ into which the coal gasifier unit 3$a$ is built. The coolant wall is not necessarily a water-cooled wall duct but may be a water-cooled jacket or a heat exchanger installed in the gas channel.

The coal gasifier unit 3$a$ has the perimeter thereof surrounded by the water-cooled wall duct 3$b$, to which water is directed as a coolant, and includes, in order from the bottom thereof, a combustor 13 and a reductor 14. The combustor 13 is a part that combusts a portion of pulverized coal and char while releasing the remainder as volatile components (carbon monoxide, hydrogen, and lower hydrocarbons) by pyrolysis. The combustor 13 uses an entrained bed; however, it may use a fluidized bed or a fixed bed.

The combustor 13 and the reductor 14 are provided with a combustor burner (not shown) and a reductor burner (not shown), respectively, to which pulverized coal is fed from the coal feed system.

The combustor burner is fed with air from an air booster (not shown) together with oxygen separated by the air separator as gasifying agents (oxidants). Thus, the combustor burner is fed with air with an adjusted oxygen concentration.

The reductor 14 gasifies pulverized coal with high-temperature gas from the combustor 13. Thus, a synthetic gas, which is a gasified-coal gas containing gas fuels such as carbon monoxide and hydrogen, is produced from the pulverized coal. The coal gasification reaction is an endothermic reaction in which the carbon in the pulverized coal and char reacts with carbon dioxide and water in the high-temperature gas to produce carbon monoxide and hydrogen.

The coal gasifier unit 3$a$ causes the pulverized coal to react with feed air fed from an air compressor 5$c$ disposed in the gas turbine system 5 to produce a synthetic gas (gasified-coal gas). Specifically, a heat exchanger unit 3$c$ is disposed downstream of the coal gasifier unit 3$a$ and has a plurality of heat exchangers (not shown) installed therein. This heat exchanger unit 3$c$ receives sensible heat from the high-temperature gas directed from the reductor 14 and produces steam from water directed to the heat exchangers.

The synthetic gas that has passed through the heat exchanger unit 3$c$ is directed to a char collector 9. This char collector 9 includes a porous filter (not shown) and captures and collects char contained in the synthetic gas as the synthetic gas passes through the porous filter. The captured char is deposited on the porous filter to form a char layer. The char layer contains concentrated Na and K from the synthetic gas, which results in the removal of the Na and K in the char collector 9.

The thus-collected char is returned to and recycled by the combustor burner of the coal gasifier 3 together with nitrogen separated by the air separator. The Na and K returned to the combustor burner together with the char are discharged from below the coal gasifier unit 3$a$ together with finally molten pulverized coal ash. The discharged molten ash is rapidly cooled with water and is pulverized to yield glassy slag.

The synthetic gas that has passed through the char collector 9 contains sulfur compounds such as carbonyl sulfide as well as carbon monoxide, hydrogen, and hydrogen sulfide. To remove such sulfur compounds, the synthetic gas is directed to and purified by a gas purifier 10. The synthetic gas purified by the gas purifier 10 is fed as a fuel gas to a gas turbine combustor 5$a$ of the gas turbine system 5.

The gas turbine system 5 includes the gas turbine combustor 5$a$, which combusts the fuel gas, i.e., the synthetic gas, the gas turbine 5$b$, which is rotated by combustion gas produced when the gas turbine combustor 5$a$ combusts the synthetic gas, and the air compressor 5*c*, which pumps high-pressure air to the gas turbine combustor 5*a*. The gas turbine 5*b* and the air compressor 5*c* are connected with the same rotating shaft 5*d*, and air compressed by the air compressor 5*c* is directed to the air booster described above as well as to the gas turbine combustor 5*a*. The combustion gas that has passed through the gas turbine 5*b* is directed to the heat recovery steam generator 11.

A steam turbine is connected to the same rotating shaft 5*d* as the gas turbine system 5, forming a single-shaft combined system. The steam turbine is fed with high-pressure steam from the coal gasifier 3 and the heat recovery steam generator 11. The gas turbine system 5 is not necessarily a single-shaft combined system but may be a double-shaft combined system.

The generator G, which produces electrical power, is disposed on the rotating shaft 5*d*, which is driven by the gas turbine 5*b* and the steam turbine. The generator G may be disposed at any position where it can produce electric power from the rotating shaft 5*d*.

The combustion gas that has passed through the gas turbine 5*b* is directed to the heat recovery steam generator 11 to produce steam to be fed to the steam turbine. The combustion gas that has been used to produce steam is directed from the heat recovery steam generator 11 to a funnel 12 and is released from the funnel 12 into the atmosphere.

Next, the operation of the integrated coal gasification combined cycle plant (gas turbine power plant) 1 including the coal gasifier 3 configured as described above will be described.

Raw coal is pulverized by the pulverizer and is directed to and stored in the hoppers. The pulverized coal stored in the hoppers is fed to the reductor burner and the combustor burner of the coal gasifier 3 together with nitrogen separated by the air separator. The combustor burner is fed not only with the pulverized coal, but also with char collected by the char collector 9.

The gas used for combustion by the combustor burner is compressed air bled from the air compressor 5*c* disposed in the gas turbine system 5, further pressurized by the air booster, and mixed with oxygen separated by the air separator. The combustor 13 partially combusts the pulverized coal and char with the combustion air and pyrolyzes the remainder into volatile components (carbon monoxide, hydrogen, and lower hydrocarbons).

The reductor 14 gasifies the pulverized coal fed from the reductor burner and the char that has released volatile components in the combustor 13 with the high-temperature gas rising from the combustor 13 to produce a combustible synthetic gas containing carbon monoxide and hydrogen.

Water flowing through the water-cooled wall duct 3*b* of the coal gasifier 3 absorbs heat from the synthetic gas passing through the reductor 14, and the synthetic gas is directed to the heat exchanger unit 3*c* disposed downstream of the coal gasifier unit 3*a*. The synthetic gas directed to the heat exchanger unit 3*c* releases its sensible heat to the individual heat exchangers to produce steam. The steam produced by the heat exchanger unit 3*c* is mainly used to drive the steam turbine. The synthetic gas that has passed through the heat exchanger unit 3*c* is directed to the char collector 9, which collects char therefrom. In the char collector 9, the Na and K in the synthetic gas are concentrated and taken into the char. The collected char containing Na and K is returned to the coal gasifier unit 3*a*.

The synthetic gas that has passed through the char collector 9 is directed to the gas turbine combustor 5*a* disposed in the gas turbine system 5 and is combusted with compressed air fed from the air compressor 5*c*. This combustion produces combustion gas, which rotates the gas turbine 5*b* to drive the rotating shaft 5*d*.

The combustion gas that has passed through the gas turbine 5*b* is directed to the heat recovery steam generator 11, which produces steam by unit of waste heat from the combustion gas. The steam produced by the heat recovery steam generator 11 is mainly used to rotate the steam turbine.

The steam turbine is rotated by the steam from the coal gasifier 3 and the steam from the heat recovery steam generator 11 to drive the rotating shaft 5*d* of the gas turbine system 5. The torque of the rotating shaft 5*d* driven by the steam turbine is converted into electrical output power by the generator G.

Next, a second embodiment of an integrated coal gasification combined cycle plant to which a coal gasifier unit according to the present invention is applied will be described below with reference to FIG. 4.

Figure 4:
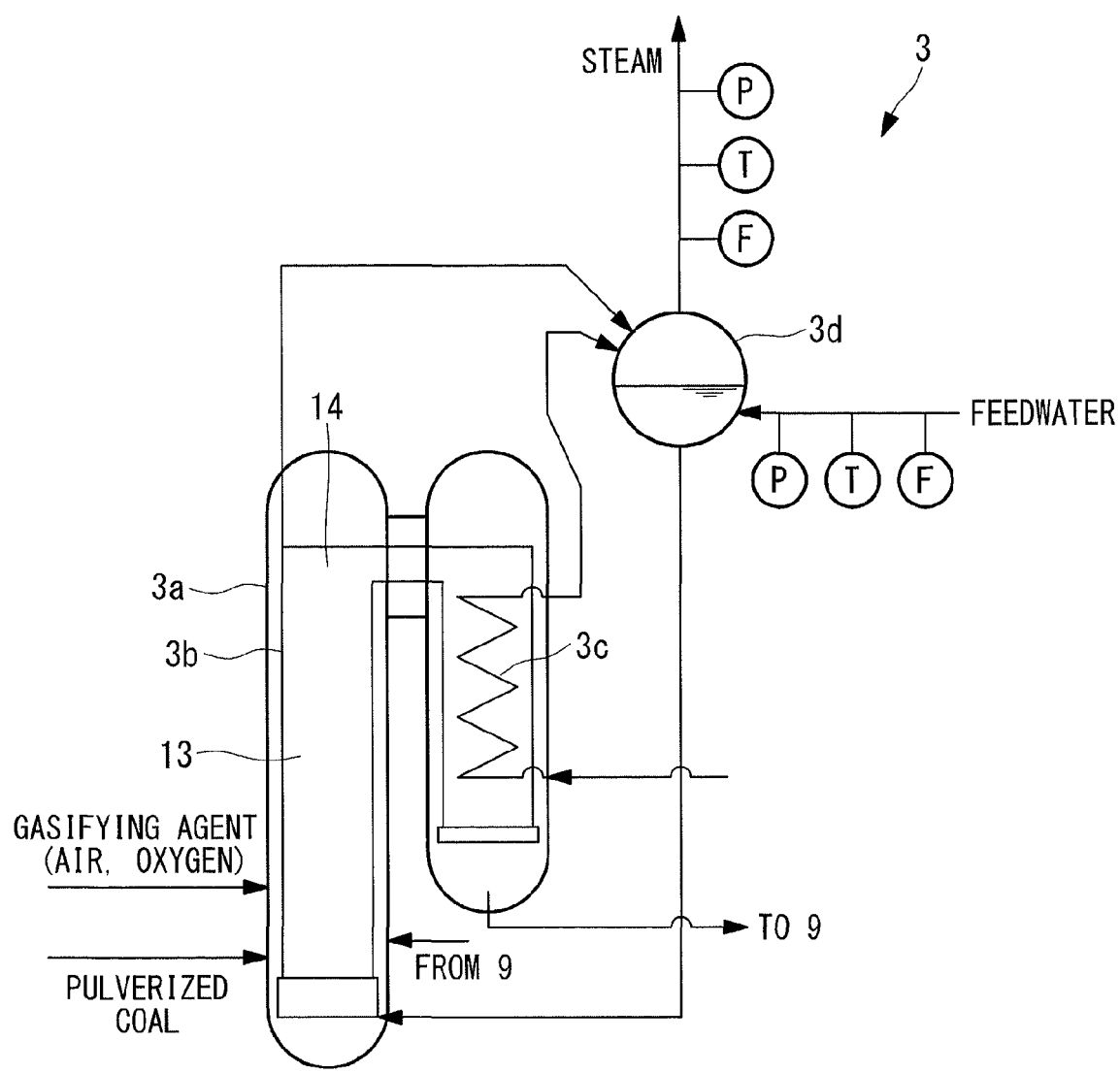
FIG. 4 is a schematic diagram of an integrated coal gasification combined cycle plant including a coal gasifier according to a second embodiment of the present invention.

FIG. 4 shows the structure of the coal gasifier 3. The second embodiment differs from the first embodiment shown in FIG. 1 in that it has a structure in which the coal gasifier 3 includes a steam drum 3*d*. The other structure is the same as that of the first embodiment shown in FIG. 1; therefore, the same components are labeled with the same reference signs, and a description thereof is omitted.

In the structure in which the coal gasifier 3 includes the steam drum 3*d*, the coolant, i.e., water, is fed to the steam drum 3*d* and is circulated through the steam drum 3*d*, the water-cooled wall duct 3*b*, and the heat exchanger unit 3*c*, and only steam produced by sensible heat from the synthetic gas in the water-cooled wall duct 3*b* and the heat exchanger unit 3*c* is directed downstream of the steam drum 3*d*. The resulting steam is mainly used to drive the steam turbine.

Next, a third embodiment of an integrated coal gasification combined cycle plant to which a coal gasifier unit according to the present invention is applied will be described below with reference to FIG. 5.

Figure 5:
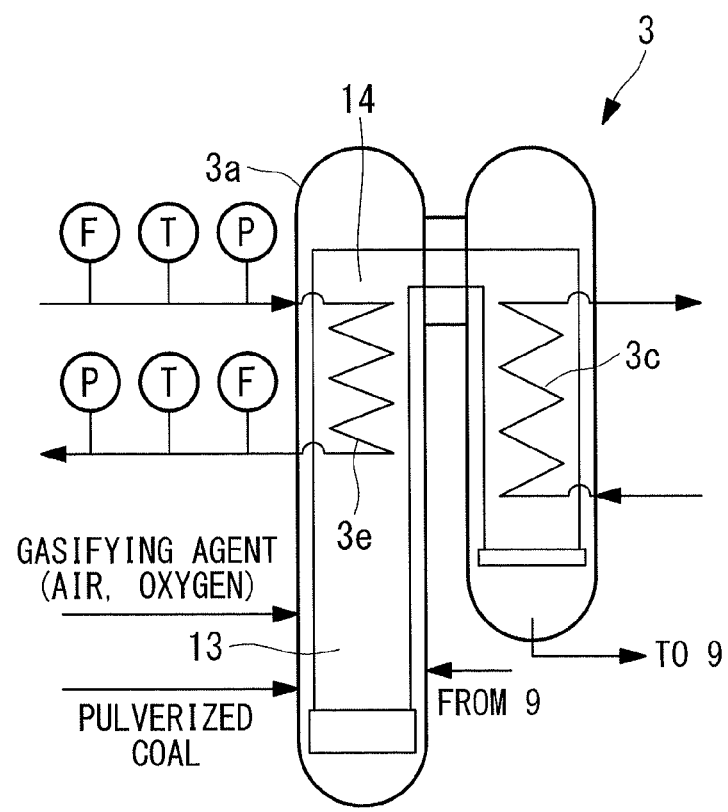
FIG. 5 is a schematic diagram of an integrated coal gasification combined cycle plant including a coal gasifier according to a third embodiment of the present invention.

FIG. 5 shows the structure of the coal gasifier 3. The third embodiment differs from the first embodiment shown in FIG. 1 in that it has a structure in which the coal gasifier unit 3*a* has a gasifier heat exchanger unit 3*e*, through which the coolant, i.e., water, flows, disposed in the gas channel thereof. The gasifier heat exchanger unit 3*e* has a plurality of heat exchangers (not shown) installed therein. The coal gasifier 3 may include the water-cooled wall duct 3*b*. The other structure is the same as that of the first embodiment shown in FIG. 1; therefore, the same components are labeled with the same reference signs, and a description thereof is omitted.

Next, a method for controlling the coal gasifier 3 in the integrated coal gasification combined cycle plant 1 described above will be described with reference to FIGS. 1 to 5.

Figure 2:
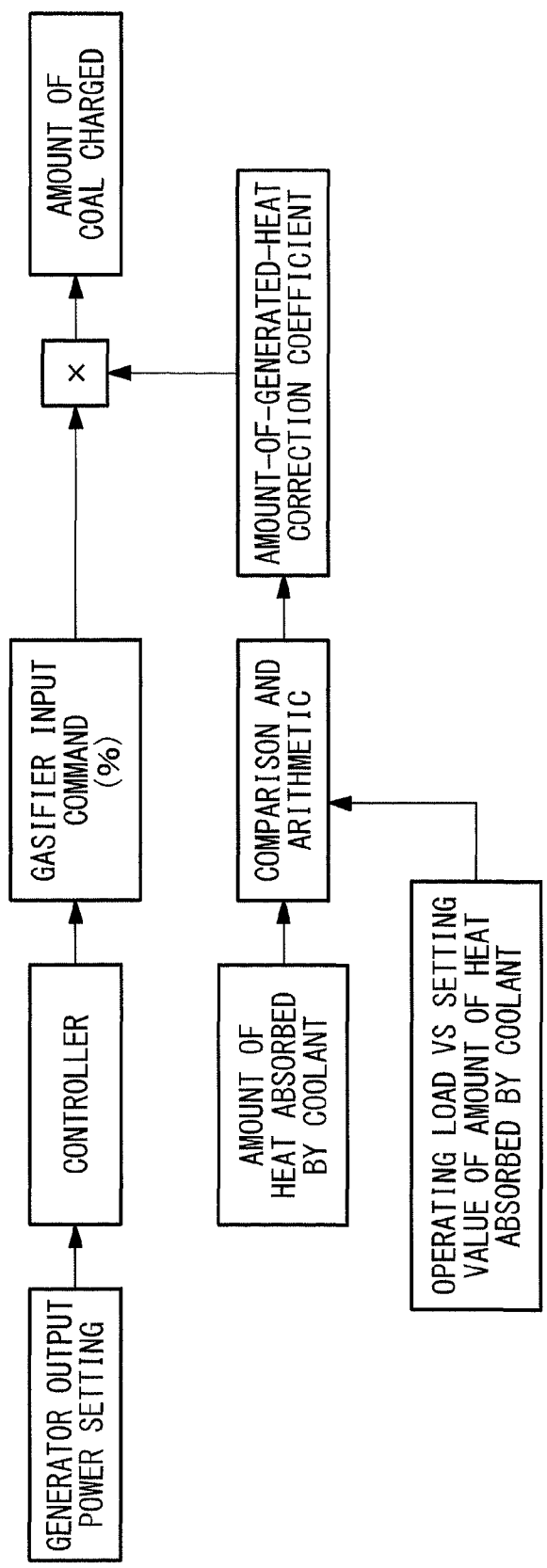
FIG. 2 is a block diagram showing a method for correcting the amount of heat generated from a synthetic gas in the coal gasifier shown in FIG. 1.
Figure 3:
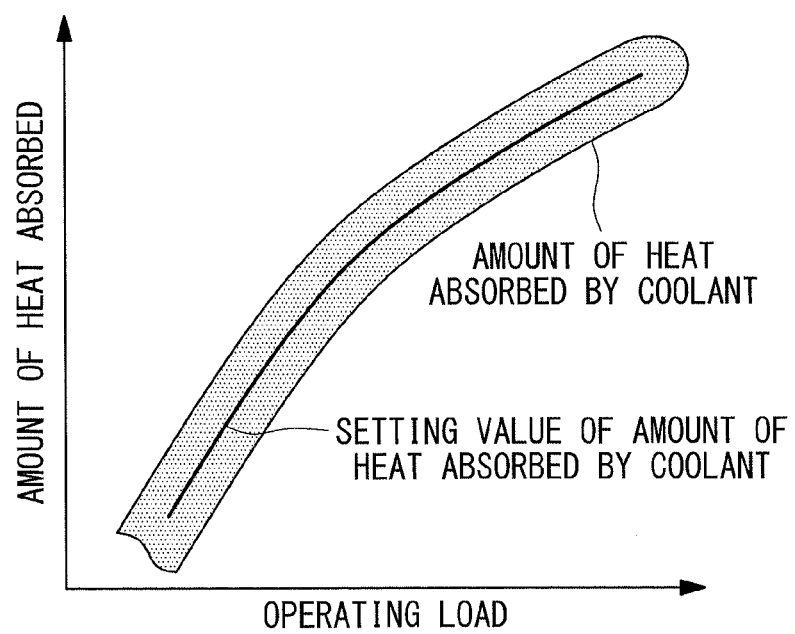
FIG. 3 is a graph showing the relationship between the amount of heat absorbed by a coolant in a heat exchanger unit and the operating load on the coal gasifier.

FIG. 2 is a block diagram showing a method for correcting the amount of heat generated from the synthetic gas produced by the coal gasifier 3 shown in FIGS. 1, 4, and 5. FIG. 3 is a graph with the vertical axis indicating the amount of heat absorbed by the water passing through the water-cooled wall duct 3*b* of the coal gasifier 3 and the horizontal axis indicating the operating load command to the coal gasifier 3. The setting value of the amount of heat absorbed in FIG. 3 refers to the relationship between the amount of heat absorbed and the operating load when the amount of heat generated from the synthetic gas produced by the coal gasifier 3 becomes stable.

The amount of pulverized coal charged (the amount of fuel fed) into the coal gasifier 3 is adjusted by a pulverized coal flow valve (not shown) that is disposed on a feed pipe (not shown) through which the pulverized coal is fed to the coal gasifier 3 and that controls the amount of pulverized coal charged to the coal gasifier 3.

A controller (not shown) disposed in the coal gasifier 3 operates the pulverized coal flow valve to control the amount of pulverized coal charged into the coal gasifier 3 depending on the amount of heat absorbed by the water directed to the water-cooled wall duct 3b of the coal gasifier 3.

Specifically, as shown in FIG. 2, the controller (control unit) calculates a coal gasifier input command value (gasifier input command value) from the setting value of the output power of the generator G. The controller also determines the setting value of the amount of heat absorbed by the coolant, i.e., the setting value of the amount of heat absorbed by the water, corresponding to the operating load command to the coal gasifier 3 from the graph in FIG. 3.

The first embodiment shown in FIG. 1 measures the flow meter of the feedwater at the inlet of the water-cooled wall duct 3b of the coal gasifier 3 or the flow meter of the steam at the outlet of the water-cooled wall duct 3b, the temperatures of the water at the inlet and the outlet of the water-cooled wall duct 3b, and the pressures at the inlet and the outlet of the water-cooled wall duct 3b.

In the structure in which the coal gasifier 3 includes the steam drum 3d, as in the second embodiment shown in FIG. 4, the flow rate of the feedwater at the inlet of the steam drum 3d or the flow rate of the steam at the outlet of the steam drum 3d, the temperatures at the inlet and the outlet of the steam drum 3d, and the pressures at the inlet and the outlet of the steam drum 3d are measured.

In the structure in which the coal gasifier unit 3a has the gasifier heat exchanger unit 3e, through which the coolant, i.e., water, flows, disposed in the gas channel thereof, as in the third embodiment shown in FIG. 5, the flow rate of the feedwater at the inlet of the gasifier heat exchanger unit 3e or the flow rate of the steam at the outlet of the gasifier heat exchanger unit 3e, the temperatures at the inlet and the outlet of the gasifier heat exchanger unit 3e, and the pressures at the inlet and the outlet of the gasifier heat exchanger unit 3e are measured.

The difference between the measured temperatures of the water at the inlet and the outlet, the measured flow rate of the water at the inlet or the outlet, the measured pressures of the water at the inlet and the outlet, and the specific heat are used to calculate the amount of heat absorbed by the coolant shown in FIG. 2, i.e., the actual amount of heat absorbed by the water. Specifically, the amount of heat absorbed is calculated by multiplying the change in enthalpy by the flow rate. To determine the change in enthalpy, the enthalpies at the inlet and the outlet need to be determined; therefore, the temperatures at the inlet and the outlet, the pressures at the inlet and the outlet, and the specific heat are needed. The flow rate needs only to be measured at the inlet or the outlet. If the water level and pressure of the steam drum 3d are controlled in the structure in which the coal gasifier 3 includes the steam drum 3d, the flow rate of the feedwater at the inlet of the steam drum 3d or the flow rate of the steam at the outlet of the steam drum 3d can be handled as the amount of heat absorbed because the saturation temperature is constant. Because the change in the amount of heat absorbed can be detected by comparing the calculated amount of heat absorbed by the coolant with the setting value of the amount of heat absorbed by the coolant determined from the graph in FIG. 3, an amount-of-generated-heat correction coefficient is calculated by performing a comparison and arithmetic on the measured amount of heat absorbed and the setting value of the amount of heat absorbed.

With the thus-determined amount-of-generated-heat correction coefficient, the coal gasifier input command value described above is corrected to calculate the amount of pulverized coal charged into the coal gasifier 3. The degree of opening of the pulverized coal flow valve is controlled so that the calculated amount of pulverized coal is charged into the coal gasifier 3.

As discussed above, the integrated coal gasification combined cycle plant 1 and the control method thereof according to this embodiment provide the following advantageous effects.

The amount of pulverized coal charged into the coal gasifier 3 is controlled depending on the change in the amount of heat generated from the synthetic gas determined from the change in the amount of heat absorbed by the water (coolant) fed to the water-cooled wall duct (coolant wall) 3b based on the amount of heat absorbed by the water directed to the water-cooled wall duct 3b of the coal gasifier (carbon-containing fuel gasifier) 3 corresponding to the operating load command to the coal gasifier 3. This allows a change in the amount of heat generated from the synthetic gas output from the coal gasifier 3 to be detected earlier than the methods in the related art in which the amount of pulverized coal charged into the coal gasifier 3 is controlled depending on the composition of the synthetic gas output from the coal gasifier 3 or the output power of the generator (power-generating unit) G. As a result, the time delay in the charge control of the pulverized coal charged into the coal gasifier 3 can be reduced to keep substantially constant the composition of the synthetic gas output from the coal gasifier 3 and the amount of heat generated from the synthetic gas directed to the gas turbine combustor 5a of the gas turbine system 5. The gas turbine 5b, therefore, can operate stably without catching fire, thus stabilizing the operation of the integrated coal gasification combined cycle plant (gas turbine power plant) 1.

The change in the amount of heat absorbed by the water directed to the coal gasifier 3 is determined from factors that correlate with the amount of heat absorbed by the water. This allows the coal gasifier 3 to be controlled before the synthetic gas reaches the gas turbine combustor 5a disposed downstream of the coal gasifier 3. As a result, the time delay in the control of the amount of pulverized coal charged into the coal gasifier 3, depending on the condition of the synthetic gas output from the coal gasifier 3 or the output power of the generator G, can be reduced. Thus, the amount of heat generated from the synthetic gas output from the coal gasifier 3 and directed to the gas turbine combustor 5a can be kept substantially constant.

The amount of heat absorbed by the water is determined using, as the factors that correlate with the amount of heat absorbed, the flow meter of the feedwater at the inlet of the water-cooled wall duct 3b of the coal gasifier 3 or the flow meter of the steam at the outlet of the water-cooled wall duct 3b, the temperatures of the water at the inlet and the outlet of the water-cooled wall duct 3b, and the pressures at the inlet and the outlet of the water-cooled wall duct 3b. This allows a change in the amount of heat generated from the synthetic gas output from the coal gasifier 3 to be detected earlier to control the amount of pulverized coal charged into the coal gasifier 3. Thus, the amount of heat generated from the synthetic gas output from the coal gasifier 3 and directed to the gas turbine combustor 5a can be kept substantially constant.

In the structure in which the coal gasifier 3 includes the steam drum 3d, as in the second embodiment shown in FIG. 4, the amount of heat absorbed is determined using, as the factors that correlate with the amount of heat absorbed, the flow rate of the feedwater at the inlet of the steam drum 3d or the flow rate of the steam at the outlet of the steam drum 3d, the temperatures at the inlet and the outlet of the steam drum 3d, and the pressures at the inlet and the outlet of the steam drum 3d. If the water level and pressure of the steam drum 3d are controlled in the structure in which the coal gasifier 3 includes the steam drum 3d, the flow rate of the feedwater at the inlet of the steam drum 3d or the flow rate of the steam at the outlet of the steam drum 3d can be handled as the amount of heat absorbed because the saturation temperature is constant.

In the structure in which the coal gasifier unit 3a has the gasifier heat exchanger unit 3e, through which water flows, disposed in the gas channel thereof, as in the third embodiment shown in FIG. 5, the amount of heat absorbed is determined using, as the factors that correlate with the amount of heat absorbed, the flow rate of the feedwater at the inlet of the gasifier heat exchanger unit 3e or the flow rate of the steam at the outlet of the gasifier heat exchanger unit 3e, the temperatures at the inlet and the outlet of the gasifier heat exchanger unit 3e, and the pressures at the inlet and the outlet of the gasifier heat exchanger unit 3e.

The graph of this embodiment shown in FIG. 3, which shows the relationship between the amount of heat absorbed by the coolant and the operating load on the coal gasifier 3, may be corrected depending on the properties (type) of coal (pulverized coal) and the amount of gasifying agent charged into the coal gasifier 3.

The operating load on the coal gasifier 3 may be replaced with the output power of the gas turbine 5b or the operating load on the entire integrated coal gasification combined cycle plant 1.

Although this embodiment illustrates the use of coal (pulverized coal) as a fuel, the fuel may instead be refuse containing carbon or scrap tires.

REFERENCE SIGNS LIST

1 integrated coal gasification combined cycle plant (gas turbine power plant)
3 coal gasifier (carbon-containing fuel gasifier)
3a coal gasifier unit (gasifier unit)
3b water-cooled wall duct (coolant wall)
3c heat exchanger unit
3d steam drum
3e gasifier heat exchanger unit
5 gas turbine system
5a gas turbine combustor (combustor)
5b gas turbine
5c air compressor
5d rotating shaft
9 char collector
10 gas purifier
11 heat recovery steam generator
12 funnel
13 combustor
14 reductor
G generator (power-generating unit)

The invention claimed is:

1. A method for controlling a gas turbine power plant equipped with
   a carbon-containing fuel gasifier including a gasifier unit that gasifies a fuel containing carbon to produce a synthetic gas and a coolant wall that is disposed on the gasifier unit and to which a coolant is directed,
   a combustor that combusts the synthetic gas to produce combustion gas,
   a gas turbine that is rotated by the combustion gas produced by the combustor, and
   a power-generating unit that generates electrical power as the gas turbine is rotated, the method comprising:
   controlling the amount of fuel fed to the carbon-containing fuel gasifier depending on the amount of heat absorbed by the coolant directed to the coolant wall.

2. The method for controlling the gas turbine power plant according to claim 1, wherein a change in the amount of heat absorbed is determined from factors that correlate with the amount of heat absorbed.

3. The method for controlling the gas turbine power plant according to claim 2, wherein the factors that correlate with the amount of heat absorbed are a flow rate of the coolant at an inlet or an outlet of the coolant wall to which the coolant is directed, temperatures of the coolant at the inlet and the outlet of the coolant wall, and pressures of the coolant at the inlet and the outlet of the coolant wall.

4. The method for controlling the gas turbine power plant according to claim 2, wherein
   the carbon-containing fuel gasifier includes a steam drum connected to the gasifier unit, and
   the factors that correlate with the amount of heat absorbed are a flow rate of feedwater at an inlet of the steam drum or flow rate of steam at an outlet of the steam drum, temperatures of the feedwater at the inlet and the temperatures of the steam at the outlet of the steam drum, and pressures of the feedwater at the inlet and the pressures of the steam at the outlet of the steam drum.

5. The method for controlling the gas turbine power plant according to claim 4, wherein
   the water level and pressure of the steam drum are controlled, and
   the flow rate of the feedwater at the inlet of the steam drum or the flow rate of the steam at the outlet of the steam drum can be handled as the amount of heat absorbed.

6. The method for controlling the gas turbine power plant according to claim 2, wherein
   the gasifier unit has a gasifier heat exchanger unit, through which the coolant flows, disposed in a gas channel thereof, and
   the factors that correlate with the amount of heat absorbed are a flow rate of feedwater at an inlet of the gasifier heat exchanger unit or a flow rate of steam at an outlet of the gasifier heat exchanger unit, temperatures at the inlet and the outlet of the gasifier heat exchanger unit, and pressures at the inlet and the outlet of the gasifier heat exchanger unit.

7. The method for controlling the gas turbine power plant according to claim 1, wherein a change in the amount of heat absorbed is detected by performing a comparison and arithmetic on a measured value of the amount of heat absorbed and a setting value of the amount of heat absorbed to calculate an amount-of-generated-heat correction coefficient, and the amount of fuel fed is controlled based on the calculated amount-of-generated-heat correction coefficient.

8. The method for controlling the gas turbine power plant according to claim 7, wherein the setting value of the amount of heat absorbed is a function of operating load.

9. The method for controlling the gas turbine power plant according to claim 8, wherein the operating load is one of a plant load command, a generator output power command, and a gasifier load command.

10. A gas turbine power plant comprising:
a carbon-containing fuel gasifier including a gasifier unit that gasifies a fuel containing carbon to produce a synthetic gas and a coolant wall that is disposed on the gasifier unit and to which a coolant is directed;
a combustor that combusts the synthetic gas to produce combustion gas;
a gas turbine that is rotated by the combustion gas produced by the combustor;
a power-generating unit that generates electrical power as the gas turbine is rotated; and
a control unit that controls the amount of fuel fed to the carbon-containing fuel gasifier depending on the amount of heat absorbed by the coolant directed to the coolant wall.

11. A method for controlling a carbon-containing fuel gasifier equipped with a carbon-containing fuel gasifier including a gasifier unit that gasifies a fuel containing carbon to produce a synthetic gas and a coolant wall that is disposed on the gasifier unit and to which a coolant is directed, the method comprising:
controlling the amount of fuel fed to the carbon-containing fuel gasifier depending on the amount of heat absorbed by the coolant directed to the coolant wall.

12. The method for controlling the carbon-containing fuel gasifier according to claim 11, wherein a change in the amount of heat absorbed is determined from factors that correlate with the amount of heat absorbed.

13. The method for controlling the carbon-containing fuel gasifier according to claim 12, wherein the factors that correlate with the amount of heat absorbed are a flow rate of the coolant at an inlet or an outlet of the coolant wall to which the coolant is directed, temperatures of the coolant at the inlet and the outlet of the coolant wall, and pressures of the coolant at the inlet and the outlet of the coolant wall.

14. The method for controlling the carbon-containing fuel gasifier according to claim 12, wherein
the carbon-containing fuel gasifier includes a steam drum connected to the gasifier unit, and
the factors that correlate with the amount of heat absorbed are a flow rate of feedwater at an inlet of the steam drum or a flow rate of steam at an outlet of the steam drum, temperatures of the feedwater at the inlet and the temperatures of the steam at the outlet of the steam drum, and pressures of the feedwater at the inlet and the pressures of the steam at the outlet of the steam drum.

15. The method for controlling the carbon-containing fuel gasifier according to claim 14, wherein
the water level and pressure of the steam drum are controlled, and
the flow rate of the feedwater at the inlet of the steam drum or the flow rate of the steam at the outlet of the steam drum can be handled as the amount of heat absorbed.

16. The method for controlling the carbon-containing fuel gasifier according to claim 12, wherein
the gasifier unit has a gasifier heat exchanger unit, through which the coolant flows, disposed in a gas channel thereof, and
the factors that correlate with the amount of heat absorbed are a flow rate of feedwater at an inlet of the gasifier heat exchanger unit or a flow rate of steam at an outlet of the gasifier heat exchanger unit, temperatures at the inlet and the outlet of the gasifier heat exchanger unit, and pressures at the inlet and the outlet of the gasifier heat exchanger unit.

17. The method for controlling the carbon-containing fuel gasifier according to claim 11, wherein a change in the amount of heat absorbed is detected by performing a comparison and arithmetic on a measured value of the amount of heat absorbed and a setting value of the amount of heat absorbed to calculate an amount-of-generated-heat correction coefficient, and the amount of fuel fed is controlled based on the calculated amount-of-generated-heat correction coefficient.

18. The method for controlling the carbon-containing fuel gasifier according to claim 17, wherein the setting value of the amount of heat absorbed is a function of operating load.

19. The method for controlling the carbon-containing fuel gasifier according to claim 18, wherein the operating load is one of a plant load command, a generator output power command, and a gasifier load command.

20. A carbon-containing fuel gasifier comprising:
a gasifier unit that gasifies a fuel containing carbon to produce a synthetic gas and a coolant wall that is disposed on the gasifier unit and to which a coolant is directed; and
a control unit that controls the amount of fuel fed depending on the amount of heat absorbed by the coolant directed to the coolant wall.

* * * * *